US012651743B2

(12) United States Patent
Moon et al.

(10) Patent No.: US 12,651,743 B2
(45) Date of Patent: Jun. 9, 2026

(54) ANODE ACTIVE MATERIAL FOR LITHIUM SECONDARY BATTERY, METHOD OF PREPARING THE SAME AND LITHIUM SECONDARY BATTERY INCLUDING THE SAME

(71) Applicants: SK ON CO., LTD., Seoul (KR); SK INNOVATION CO., LTD., Seoul (KR)

(72) Inventors: Joon Hyung Moon, Daejeon (KR); Eun Jun Park, Daejeon (KR); Jung Hyun Yun, Daejeon (KR); Ju Ho Chung, Daejeon (KR)

(73) Assignees: SK ON CO., LTD., Seoul (KR); SK INNOVATION CO., LTD., Seoul (KR)

( * ) Notice: Subject to any disclaimer, the term of this patent is extended or adjusted under 35 U.S.C. 154(b) by 500 days.

(21) Appl. No.: 18/333,806

(22) Filed: Jun. 13, 2023

(65) Prior Publication Data

US 2023/0411606 A1 Dec. 21, 2023

(30) Foreign Application Priority Data

Jun. 16, 2022 (KR) ........................ 10-2022-0073801

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0471* (2013.01); *H01M 4/386* (2013.01);
(Continued)

(58) Field of Classification Search
CPC .... H01M 4/366; H01M 4/0471; H01M 4/386; H01M 4/583; H01M 4/625; H01M 2004/021
See application file for complete search history.

(56) References Cited

U.S. PATENT DOCUMENTS

2016/0164081 A1* 6/2016 Cui ........................ H01M 4/625
427/58
2017/0092952 A1* 3/2017 Yasumiishi ........... H01M 4/366
(Continued)

FOREIGN PATENT DOCUMENTS

JP 2021-527917 A 10/2021
KR 10-1591698 B 1/2016
(Continued)

OTHER PUBLICATIONS

Xu, Y. et al., "Mesophorous carbon/silicon composite anodes with enhanced performance for lithium-ion batteries," J. of Mater. Chem, A, 2014, 2, 9751.
(Continued)

*Primary Examiner* — Christopher P Domone
(74) *Attorney, Agent, or Firm* — Perkins Coie LLP

(57) ABSTRACT

An anode active material for a lithium secondary and a lithium second battery including the same are provided. The anode active material includes a plurality of carbon-based particles containing one or more pores therein, and a silicon-containing coating formed inside the pores and/or on a surface of each of the carbon-based particles. A relative standard deviation of D/G peak intensity ratios of a Raman spectrum measured for 50 different carbon-based particles among the plurality of carbon-based particles is 10% or less.

15 Claims, 1 Drawing Sheet

(51) Int. Cl.

| | |
|---|---|
| *H01M 4/38* | (2006.01) |
| *H01M 4/583* | (2010.01) |
| *H01M 4/62* | (2006.01) |
| *H01M 10/052* | (2010.01) |
| *H01M 4/02* | (2006.01) |

(52) U.S. Cl.
CPC ........... *H01M 4/583* (2013.01); *H01M 4/625* (2013.01); *H01M 10/052* (2013.01); *H01M 2004/021* (2013.01); *H01M 2004/027* (2013.01)

(56) References Cited

U.S. PATENT DOCUMENTS

| | | | |
|---|---|---|---|
| 2018/0331354 A1* | 11/2018 | Kim ...................... | H01M 4/133 |
| 2020/0020935 A1* | 1/2020 | Costantino .............. | C01B 32/00 |
| 2021/0098781 A1* | 4/2021 | Nozoe ................... | H01M 4/133 |
| 2021/0214225 A1 | 7/2021 | Liang et al. | |

FOREIGN PATENT DOCUMENTS

| | | |
|---|---|---|
| KR | 10-2019-0122805 A | 10/2019 |
| WO | 2021/241749 A1 | 12/2021 |

OTHER PUBLICATIONS

Extended European Search Report for European Patent Application No. 23177806.9, mailed Oct. 20, 2023 (9 pages).
Office Action for Korean Patent Application No. 10-2022-0073801, mailed Mar. 23, 2026, 18 pages.

\* cited by examiner

1

ANODE ACTIVE MATERIAL FOR LITHIUM SECONDARY BATTERY, METHOD OF PREPARING THE SAME AND LITHIUM SECONDARY BATTERY INCLUDING THE SAME

CROSS-REFERENCE TO RELATED APPLICATION

This application claims priority and benefits of Korean Patent Application No. 10-2022-0073801 filed on Jun. 16, 2022 in the Korean Intellectual Property Office (KIPO), the entire disclosure of which is incorporated by reference.

TECHNICAL FIELD

The technology and implementations disclosed in this patent document generally relate to an anode active material for a lithium secondary battery.

BACKGROUND

The rapid growth of electric vehicles and portable devices, such as camcorders, mobile phones, and laptop computers, has brought increasing demands for secondary batteries, which can be charged and discharged repeatedly. Recently, a battery pack including the secondary battery has been developed and applied as a power source for an eco-friendly vehicle such as an electric vehicle, a hybrid vehicle, etc.

SUMMARY

In an aspect of the present disclosures, there is provided an anode active material for a lithium secondary battery having improved power property and capacity efficiency.

According to an aspect of the present disclosures, there is provided a method of preparing an anode active material for a lithium secondary battery having improved power property and capacity efficiency.

According to an aspect of the present disclosures, there is provided a lithium secondary battery having improved power property and capacity efficiency.

An anode active material for a lithium secondary battery includes a plurality of carbon-based particles containing one or more pores therein, and a silicon-containing coating formed inside the one or more pores, or on a surface of each of the carbon-based particles, or both inside the one or more pores and on the surface of each of the carbon-based particles. A relative standard deviation of D/G peak intensity ratios of a Raman spectrum as defined in Equation 1 measured for 50 different carbon-based particles among the plurality of carbon-based particles is 10% or less. In some implementations, carbon has Raman responses at D bands and G bands, where G bands represent the graphite-type lattice vibrations and D bands reflect the disordered graphite lattice vibrations. In one example, G bands are due to the in plane stretching motion between carbon atoms in the lattice and D bands are disordered bands originating in structural defects. In some implementations, the term "D/G peak intensity ratio" may be used to indicate the crystallinity and/or amorphousness of the carbon-based particles. In some implementations, the relative standard deviation measures the deviation of a set of numbers disseminated around the mean.

$$D/G \text{ peak intensity ratio of Raman spectrum} = I_D/I_G \quad \text{[Equation 1]}$$

2

In Equation 1, $I_D$ is a peak intensity of each carbon-based particle in a wavenumber range from 1335 cm$^{-1}$ to 1365 cm$^{-1}$ of the Raman spectrum, and $I_G$ is a peak intensity of each carbon-based particle in a wavenumber range from 1565 cm$^{-1}$ to 1620 cm$^{-1}$ of the Raman spectrum.

In some embodiments, the relative standard deviation is determined by obtaining a value by dividing a standard deviation of the D/G peak intensity ratios of the Raman spectrum by an average value of the D/G peak intensity ratios of the Raman spectrum, and then multiplying the value by 100.

In some embodiments, the D/G peak intensity ratios of the Raman spectrum may be in a range from 0.8 to 1.4

In some embodiments, each of the plurality of carbon-based particles may include at least one selected from the group consisting of activated carbon, carbon nanotube, carbon nanowire, graphene, carbon fiber, carbon black, graphite, pyrolyzed cryogel, pyrolyzed xerogel and pyro-lyzed aerogel.

In some embodiments, each of the plurality of carbon-based particles may have an amorphous structure.

In some embodiments, silicon included in the silicon-containing coating may have an amorphous structure or a crystalline structure with a crystallite size of 7 nm or less as measured by an X-ray diffraction (XRD) analysis.

In some embodiments, the crystallite size of silicon included in the silicon-containing coating may be measured by Equation 2.

$$L = \frac{0.9\lambda}{\beta \cos\theta} \quad \text{[Equation 2]}$$

In Equation 2, L represents the crystallite size (nm), $\lambda$ represents an X-ray wavelength (nm), $\beta$ represents a full width at half maximum (rad) of a peak corresponding to a (111) plane of silicon contained in the silicon-containing coating, and $\theta$ represents a diffraction angle (rad).

In some embodiments, the silicon included in the silicon-containing coating has a peak intensity ratio of 1.2 or less in a Raman spectrum defined by Equation 3.

$$\text{Peak intensity ratio of Raman spectrum} = I(515)/I(480) \quad \text{[Equation 3]}$$

In Equation 3, 1(515) is a peak intensity of silicon included in the silicon-containing coating in a wavenumber region of 515 cm$^{-1}$ in the Raman spectrum, and I(480) is a peak intensity of silicon included in the silicon-containing coating in a wavenumber region of 480 cm$^{-1}$ in the Raman spectrum.

In some embodiments, a carbon coating is further formed on the silicon-containing coating.

In some embodiments, the carbon coating may include carbon or a conductive polymer.

In some embodiments, the carbon coating may be also formed inside the pores and on a surface of the carbon-based particles where the silicon-containing coating is not formed.

A lithium secondary battery includes an anode including an anode active material layer that includes the anode active material for a lithium secondary battery implemented based on some embodiments discussed in this patent document, and a cathode facing the anode.

In a method of preparing an anode active material (e.g., anode active material for a lithium secondary battery), a first carbonization is performed on a plurality of preliminary carbon-based particles at a first temperature. A second carbonization is performed on the plurality of preliminary carbon-based particles after the first carbonization at a second temperature greater than the first temperature of the first carbonization to form a plurality of carbon-based particles each including one or more pores. A heat treatment is performed on the plurality of carbon-based particles together with a silicon source to form a silicon-containing coating inside the pores, or on a surface of each of the carbon-based particles, or both inside the one or more pores and on the surface of each of the carbon-based particles. A relative standard deviation of D/G peak intensity ratios of a Raman spectrum as defined in Equation 1 measured for 50 different carbon-based particles among the plurality of carbon-based particles is 10% or less.

$$D/G \text{ peak intensity ratio of Raman spectrum} = I_D/I_G \qquad \text{[Equation 1]}$$

In Equation 1, $I_D$ is a peak intensity of each carbon-based particle in a wavenumber range from 1335 cm$^{-1}$ to 1365 cm$^{-1}$ of the Raman spectrum, and $I_G$ is a peak intensity of each carbon-based particle in a wavenumber range from 1565 cm$^{-1}$ to 1620 cm$^{-1}$ of the Raman spectrum.

In some embodiments, the first temperature ranges from 400° C. to 600° C., and the second temperature ranges from 700° C. to 1200° C.

In some embodiments, the preliminary carbon-based particles may be formed by adding a curing agent to a resol oligomer to cure the resol oligomer, and classifying and washing the cured resol oligomer.

In some example embodiments, carbon-based particles include pores. For example, the carbon-based particle may be a porous particle including a plurality of pores. A silicon-containing coating may be formed on at least one of an inside or a surface of the pores. Accordingly, cracks due to a difference in volume expansion ratio between carbon and silicon during charging and discharging of the secondary battery may be prevented.

A relative standard deviation of D/G peak intensity ratio values of Raman spectrum measured for 50 different carbon-based particles among the plurality of carbon-based particles may be 10% or less. Accordingly, silicon included in the silicon-containing coating may be uniformly coated on the plurality of carbon-based particles. Accordingly, swelling of an anode during repeated charging and discharging of the lithium secondary battery may be reduced and life-span properties may be improved.

In some example embodiments, carbon-based particles may be gradually formed through two-step carbonization, so that a non-uniform crystallinity due to rapid high-temperature carbonization may be suppressed. Thus, the above-described relative standard deviation of the carbon-based particles may be reduced and the life-span characteristics of the lithium secondary battery may be improved.

DETAILED DESCRIPTION

Figure 1:
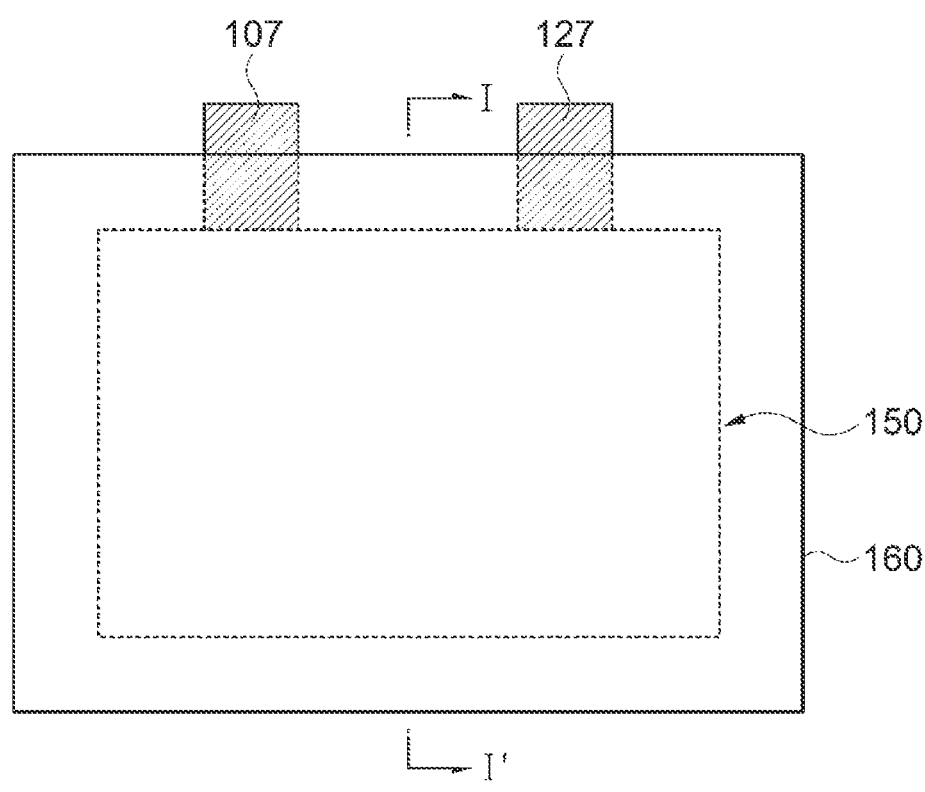
FIG. 1 is a schematic plan view illustrating an example of a lithium secondary battery based on some embodiments of the present disclosures.

Section headings are used in the present document only for ease of understanding and do not limit scope of the embodiments to the section in which they are described.

The present disclosures can be implemented in some embodiments to provide an anode active material for a secondary battery including a carbon-based particle. In some embodiments of the present disclosures, a secondary battery such as a lithium secondary battery includes the anode active material that includes a carbon-based particle. In some implementations, the term "anode active material" can be used to indicate an anode active material for a secondary battery.

Examples of the secondary battery include a lithium secondary battery, a nickel-cadmium battery, a nickel-hydrogen battery, etc. The lithium secondary battery is being widely used due to high operational voltage and energy density per unit weight, a high charging rate, a compact dimension, etc.

In some implementations, the lithium secondary battery may include an electrode assembly including a cathode, an anode and a separation layer (separator), and an electrolyte immersing the electrode assembly. The lithium secondary battery may also include an outer case having, e.g., a pouch shape for accommodating the electrode assembly and the electrolyte.

In some implementations, a composite of high-capacitance silicon and carbon may be used as an anode active material in a lithium secondary battery that has a higher capacity and power. However, the silicon-carbon composite anode active material has a large volume expansion difference that can cause cracks in the anode active material and exposure to an electrolyte solution during repeated charging and discharging.

In order to address these issues, the present disclosures can be implemented in some embodiments to provide an anode active material that can maintain its capacity properties while suppressing the cracks in the anode active material.

In some implementations, the anode active material may be formed to include both silicon and one or more carbon-based particles. In this case, carbon may partially mitigate a volume expansion of silicon. However, during charging and discharging of a secondary battery, a difference between a volume expansion ratio of silicon (e.g., about 400% or more) and a volume expansion ratio of carbon (e.g., about 150% or less) increases, resulting in cracks in the anode active material. Accordingly, when charging and discharging are repeated, the anode active material may be exposed to an electrolyte, thereby causing side reactions such as a gas generation and degrading life-span properties of the secondary battery.

In some embodiments of the present disclosures, the carbon-based particle includes pores. For example, the carbon-based particle may be a porous particle including a plurality of pores therein.

In some embodiments, a silicon-containing coating may be formed at least one of: inside the pores; or on a surface of the carbon-based particle. Accordingly, cracks due to the difference of the volume expansion ratios between carbon and silicon may be prevented during charging and discharging.

For example, the inside of the pores may include a portion indented from the surface into an inside of the carbon-based particle. For example, the silicon-containing coating may be formed on the indented portion of the surface of the carbon-based particle.

In example embodiments, the carbon-based particle may have a pore size of 20 nm or less, or less than 10 nm. Within this range, excessive deposition of silicon in the pores may be prevented. Accordingly, defects caused by the difference of the volume expansion ratio between carbon and silicon during charging and discharging of the secondary battery may be further suppressed.

In some embodiments, the pore size of the carbon-based particle may be in a range from 0.1 nm to 20 nm, or from 0.1 nm to 10 nm.

For example, the above-mentioned carbon-based particle may include an activated carbon, a carbon nanotube, a carbon nanowire, graphene, a carbon fiber, carbon black, graphite, a porous carbon, pyrolyzed cryogel, pyrolyzed xerogel, pyrolyzed aerogel, etc. These may be used alone or in a combination thereof.

In some embodiments, the carbon-based particle may have an amorphous structure or a crystalline structure.

In some embodiments, the carbon-based particles may include an amorphous structure. Accordingly, durability of the anode active material may be increased, and generation of cracks by the charge/discharge or the external impact may be suppressed. Thus, the life-span properties of the secondary battery may be improved.

In example embodiments, the anode active material may include a silicon-containing coating formed inside the pores of the carbon-based particle and/or on a surface of the carbon-based particle. The difference of the volume expansion ratio between carbon and silicon may be alleviated while employing high capacity properties of silicon included in the silicon-containing coating. Thus, micro-cracks and exposure to an electrolyte caused by repeated charging and discharging of the secondary battery may be reduced, and the life-span properties of the secondary battery may be improved while maintaining power properties.

For example, the silicon-containing coating may refer to a layer in which silicon particles are formed on at least a portion of the pores and/or the surface of the carbon-based particle.

As a degree of crystallinity of the carbon-based particles is uniform, silicon may be uniformly coated at the inside of the pores of the carbon-based particles or on the surface of the carbon-based particles. For example, when the crystallinity of each portion of the carbon-based particle is non-uniform, silicon may be non-uniformly coated, which may increase swelling of the anode active material and may deteriorate the life-span properties of the secondary battery.

The anode active material for a lithium secondary battery may include a plurality of the carbon-based particles.

In example embodiments, a relative standard deviation (RSD) of D/G peak intensity ratio (as defined as Equation 1 below) values of Raman spectrum measured for 50 different carbon-based particles among the plurality of the carbon-based particles is 10% or less. In some embodiments, the relative standard deviation may be in a range from 1% to 8%.

$$D/G \text{ peak intensity ratio of Raman spectrum} = I_D/I_G \qquad \text{[Equation 1]}$$

In Equation 1, $I_D$ is a peak intensity of each carbon-based particle in a wavenumber range from 1335 cm$^{-1}$ to 1365 cm$^{-1}$ of the Raman spectrum, and $I_G$ is a peak intensity of each carbon-based particle in a wavenumber range from 1565 cm$^{-1}$ to 1620 cm$^{-1}$ of the Raman spectrum.

For example, in Equation 1, $I_D$ may be a peak intensity in a D band of each carbon-based particle, and $I_G$ may be a peak intensity in a G band of each carbon-based particle.

For example, the D/G peak intensity ratio may represent a degree of crystallinity or amorphousness of the carbon-based particles. As the D/G peak intensity ratio increases, the carbon-based particles may have an amorphous structure. As the D/G peak intensity ratio decreases, the carbon-based particles may have a highly crystalline structure In some embodiments, the relative standard deviation may be obtained by dividing a standard deviation of the D/G peak intensity ratio values of Equation 1 measured for each of 50 different carbon-based particles by an average value of the corresponding values, and then multiplying by 100.

For example, the relative standard deviation may represent a degree of non-uniformity in crystallinity of a plurality of the carbon-based particles. As the relative standard deviation becomes smaller, uniformity in the crystallinity of the carbon-based particles may increase.

Within the relative standard deviation range, silicon included in the silicon-containing coating may be uniformly coated at the inside of the pores of the carbon-based particle and/or on the surface of the carbon-based particle. Thus, swelling of the anode during repeated charging and discharging of the lithium secondary battery may be prevented and the life-span properties may be improved.

In some embodiments, the D/G peak intensity ratio of the Raman spectrum may be in a range from 0.8 to 1.4, or from 0.9 to 1.2. Within this range, generation of cracks due to excessive crystallization may be suppressed while preventing deterioration of crystallinity due to excessive amorphization of the carbon-based particles. Accordingly, resistance of the secondary battery may be reduced and operational stability may be improved.

In example embodiments, the D/G peak intensity ratio values of the Raman spectrum may be measured for 50 different carbon-based particles among a plurality of carbon-based particles.

For example, a sample is formed by uniformly applying the anode active material particles for a lithium secondary battery on a substrate, and the D/G peak intensity ratio of the Raman spectrum is measured using 50 different points on the sample. The relative standard deviation is determined by dividing a standard deviation of the 50 measured D/G peak intensity ratio values by an average value of the values and then multiplying by 100.

In example embodiments, the above-described silicon-containing coating may have an amorphous structure or may contain silicon having a crystallite size of 7 nm or less as measured by an X-ray diffraction (XRD) analysis. In some embodiments, the crystallite size may be 4 nm or less. Within the above range, mechanical stability of the anode active material may be improved during the press process for manufacturing the lithium secondary battery or during the repeated charging and discharging. Accordingly, a capacity retention may be increased to improve the life-span properties of the lithium secondary battery.

In some implementations, the term "amorphous structure" refers to a case that a shape of a single silicon included in the silicon-containing coating is amorphous or a case that a crystallite size is excessively small and may not be measured through a Scherrer equation represented by Equation 2 using the X-ray diffraction (XRD) analysis.

$$L = \frac{0.9\lambda}{\beta\cos\theta} \qquad \text{[Equation 2]}$$

In Equation 2 above, L represents the crystallite size (nm), $\lambda$ represents an X-ray wavelength (nm), $\beta$ represents a full width at half maximum (FWHM) of a peak, and $\theta$ represents a diffraction angle (rad). In example embodiments, the FWHM in the XRD analysis for measuring the crystallite size may be measured from a peak of (111) plane of silicon contained in the silicon-containing coating.

In some embodiments, in Equation 2 above, β may represent a FWHM obtained by correcting a value derived from an equipment. In an embodiment, Si may be used as a standard material for reflecting the equipment-derived value. In this case, the device-derived FWHM may be expressed as a function of 2θ by fitting a FWHM profile in an entire 2θ range of Si. Thereafter, a value obtained by subtracting and correcting the equipment-derived FWHM value at the corresponding 2θ from the function may be used as β.

In some embodiments, the silicon-containing coating may further contain at least one selected from the group consisting of SiOx (0<x<2) and silicon carbide (SiC).

In some embodiments, silicon carbide may not be formed at the inside of the pores or on the surface of the carbon-based particle. For example, the silicon-containing coating may not include silicon carbide. For example, the silicon-containing coating may contain only silicon and/or silicon oxide. Accordingly, the capacity properties of the secondary battery may be improved.

For example, the formation of silicon carbide may be suppressed by adjusting a temperature and a time of a silicon deposition.

In some embodiments, the above-described silicon may include an amorphous structure. In this case, the crystallite size of silicon and a peak intensity ratio of the Raman spectrum as described later may be maintained within an appropriate range. Accordingly, improved life-span properties may be achieved while maintaining the capacity properties.

In example embodiments, a peak intensity ratio from a Raman spectrum of silicon included in the silicon-containing coating defined by Equation 4 below may be 1.2 or less, or 1.0 or less.

$$\text{Peak intensity ratio of Raman spectrum} = I(515)/I(480) \qquad \text{[Equation 3]}$$

In Equation 4, I(515) is a peak intensity of silicon included in the silicon-containing coating in a region corresponding to a wavenumber of 515 cm$^{-1}$ in the Raman spectrum, and I(480) is a peak intensity of silicon included in the silicon-containing coating in a region corresponding to a wavenumber of 480 cm$^{-1}$ in the Raman spectrum.

For example, I(515) in Equation 4 may represent a portion of silicon having a crystalline structure included in the silicon-containing coating, and I(480) in Equation 4 may represent a portion of silicon having an amorphous structure included in the silicon-containing coating.

In the peak intensity ratio range, the amorphous structure ratio of silicon included in the silicon-containing coating may be increased, so that structural stability of the anode active material may be improved. Accordingly, the life-span properties of the secondary battery may be improved.

In some embodiments, both the above-described crystallite size range and the peak intensity ratio range from the Raman spectrum of silicon included in the silicon-containing coating may be satisfied. Accordingly, the amorphous properties of the silicon-containing coating may be further improved, and stability of the anode active material may also be improved. Thus, the life-span properties of the anode active material may be further improved.

In some embodiments, a carbon coating may be further formed on the above-described silicon-containing coating. Accordingly, a contact between silicon of the anode active material and moisture in an air or a contact between silicon and water in the anode slurry may be prevented. Thus, a reduction of a discharge capacity and capacity efficiency of the secondary battery may be suppressed during a period from a preparation of the anode active material to a formation of the anode.

For example, the carbon coating may refer to a layer in which carbon particles are formed on at least a portion of the silicon-containing coating.

In some embodiments, the carbon coating may include at least one of carbon or a conductive polymer. Accordingly, the above-described effect of preventing the contact between water and silicon may be implemented while facilitating the formation of the carbon coating. Thus, the reduction of the discharge capacity and capacity efficiency of the secondary battery may be suppressed.

For example, the conductive polymer may include polyacetylene, polyaniline, polypyrrole and/or polythiophene.

In some embodiments, the carbon coating may also be formed on a portion of the inside of the pores and the surface of the carbon-based particle on which the silicon-containing coating is not formed. For example, the carbon coating may entirely cover silicon and the carbon-based particle on the carbon-based particle including the silicon-containing coating formed thereon. Thus, mechanical and chemical stability of the anode active material may be improved while preventing the contact between silicon and water.

Hereinafter, a method of preparing the anode active material based on example embodiments is described in more detail.

In example embodiments, a carbon-based particle including pores may be prepared.

In some embodiments, a preliminary carbon-based particle for forming the carbon-based particle may be formed.

For example, a resol oligomer may be prepared by mixing an aromatic compound containing a hydroxyl group with an aldehyde-based compound. For example, the aromatic compound including the hydroxyl group may include phenol, and the aldehyde-based compound may include formaldehyde. The resol oligomer may be cured by adding a curing agent, and then the preliminary carbon-based particle including pores may be obtained by classification and washing with water. For example, a plurality of preliminary carbon-based particles may be prepared.

In some embodiments, an aromatic compound and a vinyl-based compound may be mixed and polymerized. Thereafter, the preliminary carbon-based particle including pores may be obtained by washing with water. For example, the aromatic compound may include polystyrene, and the vinyl-based compound may include divinylbenzene.

In example embodiments, a first carbonization of the preliminary carbon-based particles may be performed. For example, surfaces of each of the preliminary carbon-based particles may be partially carbonized through the first carbonization.

In some embodiments, the first carbonization may be performed at a first temperature from 400° C. to 600° C. In the above temperature range, non-uniform carbonization between carbon-based particles may be suppressed while sufficiently performing the partial carbonization of the carbon-based particles.

In an embodiment, the first carbonization may be performed for 2 hours to 10 hours under a nitrogen atmosphere.

In example embodiments, a second carbonization may be performed for the plurality of the preliminary carbon-based particles after the first carbonization to form a plurality of carbon-based particles each including pores. For example, a surface carbonization degree of the plurality of the carbon-based particles may become substantially more uniform through the second carbonization.

In some embodiments, the second carbonization may be performed at a second temperature higher than the first temperature. For example, the second temperature ranges from 700° C. to 1200° C. In the above temperature range, crystallinity between the plurality of the carbon-based particles may be uniformly formed, and excessive crystallization of the carbon-based particles may be prevented. Accordingly, the relative standard deviation of the peak intensity ratio of the above-described Raman spectrum may be reduced.

In some embodiments, the second carbonization may be performed for 2 hours to 10 hours under a nitrogen atmosphere.

In example embodiments, the carbon-based particles may be gradually formed through the two-step carbonization, so that a non-uniform crystallinity due to rapid high-temperature carbonization may be suppressed. Accordingly, the relative standard deviation of the carbon-based particles may be reduced and the life-span properties of the secondary battery may be improved.

In some embodiments, an activation process may be performed. Accordingly, an activity of the porous structure in the carbon-based particles may be easily controlled.

In one embodiment, the activation process may include a physical activation. For example, the physical activation may be performed by a heat treatment at a temperature from 700° C. to 1000° C. while introducing a gas reactive with carbon (steam, a carbon dioxide gas, or a mixed gas of steam, the carbon dioxide gas and an inert gas).

In one embodiment, the activation process may include a chemical activation. For example, an acidic or basic chemical such as KOH, $Na_2CO_3$, NaOH and $H_3PO_4$ may be used as an activator. The chemical activation may be performed at a lower temperature than that of the physical activation.

Size of pores included in the carbon-based particles obtained by the above method may be 20 nm or less.

In example embodiments, a silicon source may be injected to a reactor in which the carbon-based particles are input, and then a heat treatment is performed to form the silicon-containing coating at an inside of pores and/or a surface of each carbon-based particle For example, the silicon source may include a silicon-containing gas. In an embodiment, the silicon-containing gas may be a silane gas.

In some embodiments, the firing for forming a silicon-containing coating may be performed at less than 600° C. Within the above temperature range, silicon having an amorphous structure may be sufficiently included in the silicon-containing coating. Accordingly, mechanical stability of the anode active material may be improved during a press process or repeated charging and discharging of the secondary battery.

In some embodiments, a carbon coating may be formed on the silicon-containing coating by introducing a carbon source into the reactor.

For example, the carbon source may include pitch, glucose, sucrose, a phenolic hydrocarbon and/or resorcinol-based hydrocarbons. In this case, the firing may be performed after the introduction of the carbon source.

In some embodiments, the carbon source may include a methane gas, an ethylene gas, a propylene gas, an acetylene gas, etc. These may be used alone or in a combination thereof. In this case, the carbon coating may be formed by a chemical vapor deposition (CVD). For example, the chemical vapor deposition may be performed while introducing and firing the carbon source.

In some embodiments, the carbon source may be a conductive polymer including at least one of polyacetylene, polyaniline, polypyrrole or polythiophene. In this case, the carbon coating may be formed by a chemical vapor deposition, an electro-polymerization or a solution process.

In an embodiment, the conductive polymer may be modified into carbon by firing after coating the conductive polymer.

In some embodiments, the firing for forming the carbon coating may be performed at a temperature less than 600° C. In the above temperature range, a ratio of carbon included in the carbon coating and silicon included in the silicon-containing coating having the amorphous structure may be sufficiently increased. Accordingly, mechanical stability of the anode active material may be improved during the press process or repeated charging and discharging of the secondary battery.

Figure 2:
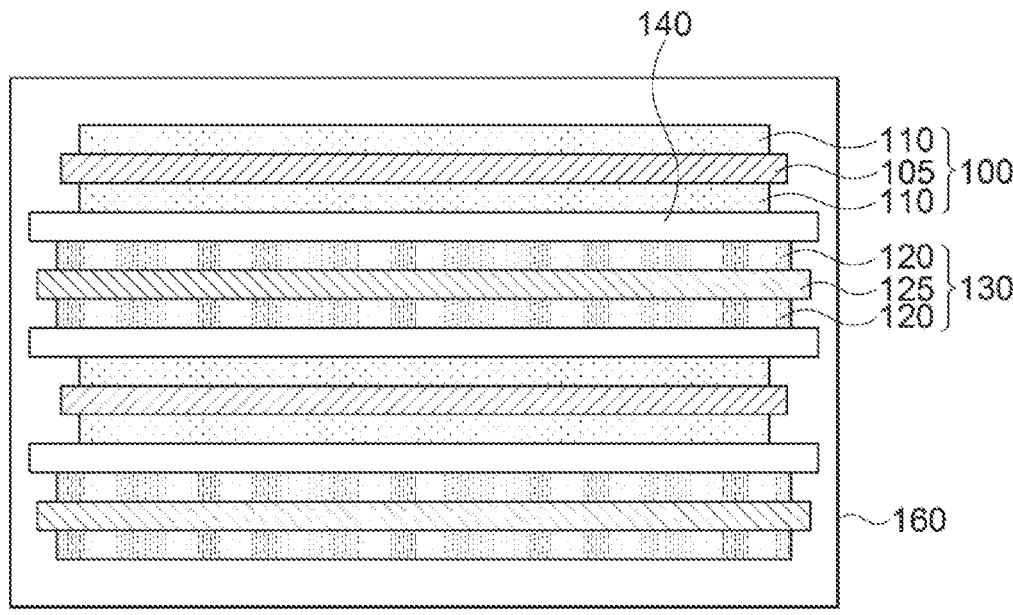
FIG. 2 is a schematic cross-sectional view illustrating an example of a lithium secondary battery based on some embodiments of the present disclosures.

FIGS. 1 and 2 are a schematic plan view and a schematic cross-sectional view, respectively, illustrating a secondary battery according to example embodiments. For example, FIG. 2 is a cross-sectional view taken along a line I-I' in FIG. 1 in a thickness direction of the lithium secondary battery.

Referring to FIGS. 1 and 2, a lithium secondary battery may include an electrode assembly including an anode 130, a cathode 100 and a separation layer 140 interposed between the cathode and the anode. The electrode assembly may be accommodated and impregnated with an electrolyte in a case 160.

The cathode 100 may include a cathode active material layer 110 formed by coating a mixture containing a cathode active material on a cathode current collector 105.

The cathode current collector 105 may include aluminum, stainless steel, nickel, titanium, or an alloy thereof, or aluminum or stainless steel surface-treated with carbon, nickel, titanium and/or silver.

The cathode active material may include a compound capable of reversibly intercalating and de-intercalating lithium ions.

In example embodiments, the cathode active material may include a lithium-transition metal oxide. For example, the lithium-transition metal oxide includes nickel (Ni) and may further include at least one of cobalt (Co) or manganese (Mn).

For example, the lithium-transition metal oxide may be represented by Chemical Formula 1 below.

$$Li_xNi_{1-y}M_yO_{2+z} \qquad \text{[Chemical Formula 1]}$$

In Chemical Formula 1, $0.9 \leq x \leq 1.2$, $0 \leq y \leq 0.7$, and $-0.1 \leq z \leq 0.1$. M may include at least one element selected from Na, Mg, Ca, Y, Ti, Hf, V, Nb, Ta, Cr, Mo, W, Mn, Co, Fe, Cu, Ag, Zn, B, Al, Ga, C, Si, Sn and Zr.

In some embodiments, a molar ratio or a concentration $(1-y)$ of Ni in Chemical Formula 1 may be greater than or equal to 0.8, and may exceed 0.8 in some embodiments.

The mixture may be prepared by mixing and stifling the cathode active material in a solvent with a binder, a conductive material and/or a dispersive agent. The mixture may be coated on the cathode current collector 105, and then dried and pressed to form the cathode 100.

The solvent may include a non-aqueous solvent. For example, N-methyl-2-pyrrolidone (NMP), dimethylformamide, dimethylacetamide, N,N-dimethylaminopropylamine, ethylene oxide, tetrahydrofuran, etc., may be used.

For example, the binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be included to promote an electron mobility between active material particles. For example, the conductive material may include a carbon-based conductive material such as graphite, carbon black, graphene, carbon nanotube, etc., and/or a metal-based conductive material such as tin, tin oxide, titanium oxide, a perovskite material such as $LaSrCoO_3$, $LaSr4MnO_3$, etc.

In example embodiments, an anode slurry may be prepared from the above-described anode active material including the carbon-based particles and the silicon-containing coating. For example, the anode slurry may be prepared by mixing and stirring the anode active material with an anode binder, a conductive material and a thickener in a solvent.

The anode active material may include a silicon-carbon containing particle including the carbon-based particle and the silicon-containing coating.

In some embodiments, the anode active material may include a plurality of the silicon-carbon containing particles and a graphite-based active material. For example, the graphite-based active material may include artificial graphite and/or natural graphite.

An amount of the silicon-carbon containing particles based on a total weight of the anode active material (e.g., the total weight of the silicon-carbon containing particles and the graphite-based active material) may be 3 wt % or more, 5 wt % or more, 10 wt % or more, 15 wt % or more, 20 wt % or more, 25 wt % or more, 30 wt % or more, 35 wt % or more, 40 wt % or more, or 45 wt % or more.

The amount of the silicon-carbon containing particles based on the total weight of the anode active material may be 90 wt % or less, 85 wt % or less, 80 wt % or less, 75 wt % or less, 70 wt % or less, 65 wt % or less, 60 wt % or less, 55 wt % or less, or 50 wt % or less.

In an embodiment, the anode active material may substantially consist of the silicon-carbon containing particles and the graphite-based active material.

For example, the solvent included in the anode slurry may be an aqueous solvent such as water, an aqueous hydrochloric acid solution, or an aqueous sodium hydroxide solution, etc.

For example, the anode binder may include a polymer material such as styrene-butadiene rubber (SBR). Examples of the thickener include carboxymethyl cellulose (CMC).

For example, the conductive material may include a material of the same type as that of the above-described conductive material included for forming the cathode active material layer.

In some embodiments, the anode 130 may include an anode active material layer 120 formed by applying (coating) the above-described anode slurry on at least one surface of an anode current collector 125 and then drying and pressing the anode slurry.

The anode current collector 125 may include a metal that has high conductivity, and may be easily adhered to the anode slurry and non-reactive within a voltage range of the battery. For example, stainless steel, nickel, copper, titanium, an alloy thereof, or copper or stainless steel surface-treated with carbon, nickel, titanium or silver may be used.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, etc. The separation layer 140 may be also formed from a non-woven fabric including a glass fiber with a high melting point, a polyethylene terephthalate fiber, etc.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without loss by, e.g., precipitation or sedimentation. Thus, the improvement of capacity and power by the above-described anode active material may be effectively achieved.

In exemplary embodiments, an electrode cell may be defined by the cathode 100, the anode 130 and the separation layer 140, and a plurality of the electrode cells may be stacked to form the electrode assembly 150 having, e.g., a jelly roll shape. For example, the electrode assembly 150 may be formed by winding, laminating or folding of the separation layer 140.

The electrode assembly 150 may be accommodated together with an electrolyte in the case 160 to define the lithium secondary battery. In example embodiments, a non-aqueous electrolyte may be used as the electrolyte.

The non-aqueous electrolyte may include a lithium salt and an organic solvent. The lithium salt and may be represented by $Li^+X^-$. An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 1, electrode tabs (a cathode tab and an anode tab) may protrude from the cathode current collector 105 and the anode electrode current collector 125 included in each electrode cell to one side of the case 160. The electrode tabs may be welded together with the one side of the case 160 to form an electrode lead (a cathode lead 107 and an anode lead 127) extending or exposed to an outside of the case 160.

The lithium secondary battery may be manufactured in, e.g., a cylindrical shape using a can, a square shape, a pouch shape or a coin shape.

Hereinafter, some example embodiments of the present disclosures will be discussed.

Example 1

Preparation of Carbon-Based Particle i) Synthesis of resol oligomer: Phenol and formaldehyde were mixed in a molar ratio of 1:2, and 1.5 wt % of triethylamine was added thereto, followed by a reaction under conditions of 85° C., 4 hours and 160 rpm (stirring).

ii) Suspension stabilization of resol oligomer: 1 g of poly(vinyl alcohol) (PVA) was dispersed in a water-dispersible medium, and then added to the resol oligomer.

iii) Curing of resol oligomer: 3 g of HMTA (hexamethylene tetramine) as a curing agent was added to the resol oligomer, and reacted under conditions of 98° C., 12 hours and 400 rpm (with stirring).

iv) Obtaining carbon material: The cured resol oligomer was classified using a sieve, and then washed with $H_2O$.

v) Unreacted monomers and oligomers were removed from the washed resol oligomer using ethanol and dried to obtain preliminary carbon-based particles.

vi) First Carbonization: A heat treatment process is performed on the preliminary carbon-based particles at 600° C. for 6 hours under a nitrogen atmosphere.

vii) Second Carbonization: After the first carbonization, a heat treatment process is performed on the preliminary carbon-based particles at 900° C. for 6 hours under a nitrogen atmosphere after the first carbonization.

Formation of Silicon-Containing Coating

A silane gas was injected into a CVD coater at a flow rate in a range from 50 mL/min to 100 mL/min, and a temperature was maintained at less than 600° C. for about 120 minutes to 240 minutes at a heating rate of 5° C./min to 20° C./min to form an anode active material containing a silicon-containing coating.

Fabrication of Anode

The prepared anode active material was left for one day. 95.5 wt % of a mixture of 15 wt % of the prepared anode active material and 80.5 wt % of artificial graphite, 1 wt % of CNT as a conductive material, 2 wt % of styrene-butadiene rubber (SBR) as a binder, and 1.5 wt % of carboxymethyl cellulose (CMC) as a thickener were mixed to form an anode slurry.

The anode slurry was coated on a copper substrate, and dried and pressed to obtain an anode.

Fabrication of Li-Half Cell

A lithium-half cell was manufactured using the anode manufactured as described above and a lithium metal as a counter electrode (cathode).

Specifically, a lithium coin half-cell was constructed by interposing a separator (polyethylene, thickness of 20 μm) between the prepared anode and the lithium metal (thickness of 1 mm).

The assembly of lithium metal/separator/cathode was placed in a coin cell plate, an electrolyte was injected, a cap was covered, and then clamped. The electrolyte was prepared by preparing a 1M $LiPF_6$ solution using a mixed solvent of EC/EMC (3:7; volume ratio), and then adding 2.0 vol % of FEC based on a total volume of the electrolyte. An impregnation for 3 to 24 hours after clamping was performed, and then 3 cycles of charging and discharging at 0.1 C were performed (charging condition CC-CV 0.1 C 0.01V 0.01 C CUT-OFF, discharging condition CC 0.1 C 1.5V CUT-OFF).

Example 2

An anode and a lithium half-cell were prepared by the same method as that in Example 1, except that the first carbonization was performed at 500° C.

Example 3

An anode and a lithium half-cell were prepared by the same method as that in Example 1, except that the first carbonization was performed at 400° C.

Example 4

An anode and a lithium half-cell were prepared by the same method as that in Example 1, except that the first carbonization was performed at 350° C.

Example 5

An anode and a lithium half-cell were prepared by the same method as that in Example 1, except that the first carbonization was performed at 650° C.

Example 6

An anode and a lithium half-cell were prepared by the same method as that in Example 1, except that the second carbonization was performed at 700° C.

Example 7

An anode and a lithium half-cell were prepared by the same method as that in Example 1, except that the second carbonization was performed at 800° C.

Example 8

An anode and a lithium half-cell were prepared by the same method as that in Example 1, except that the second carbonization was performed at 1000° C.

Example 9

An anode and a lithium half-cell were prepared by the same method as that in Example 1, except that the second carbonization was performed at 1200° C.

Example 10

An anode and a lithium half-cell were prepared by the same method as that in Example 1, except that the second carbonization was performed at 1300° C.

Example 11

An anode and a lithium half-cell were prepared by the same method as that in Example 1, except that the second carbonization was performed at 650° C.

Example 12

The anode active material having the silicon-containing coating was introduced into a thermal CVD chamber, and then a mixed gas of ethylene gas and argon was supplied and heat-treated at less than 600° C. to prepare an anode active material having a carbon coating formed on the silicon-containing coating.

An anode and a lithium half-cell were prepared by the same method as that in Example 1, except that the-above process was further performed.

Examples 13 and 14

Silicon-containing coatings included in anode active materials according to Examples 13 and 14 were formed by changing the silane gas flow rate, the heating rate, the temperature and the time.

An anode and a lithium half-cell were prepared by the same method as that in Example 1, except that a silicon-containing coating was formed by injecting silane gas into a CVD coater at a flow rate of 100 mL/min to 500 mL/min and maintaining a temperature at 600° C. or higher for about 30 minutes to 120 minutes at a heating rate of 5° C./min to 20° C./min.

Comparative Example 1

An anode and a lithium half-cell were prepared by the same method as that in Example 1, except that only the second carbonization was performed, and the first carbonization was omitted.

Comparative Example 2

An anode and a lithium half-cell were prepared by the same method as that in Example 1, except that only the first carbonization was performed and the second carbonization was not performed.

Comparative Example 3

An anode and a lithium half-cell were prepared by the same method as that in Example 1, except that the first carbonization was performed at 700° C.

Comparative Example 4

An anode and a lithium half-cell were prepared by the same method as that in Example 1, except that the first carbonization was performed at 300° C.

Comparative Example 5

An anode and a lithium half-cell were prepared by the same method as that in Example 1, except that the second carbonization was performed at 1400° C.

Experimental Example (1) Raman Spectroscopy Analysis of Carbon-Based Particle For the anode active materials prepared according to the above-described Examples and Comparative Examples, Raman spectra of 50 carbon-based particles were measured using a 532 nm laser Raman spectroscopy. Specifically, after the anode active material was applied on the substrate, Raman spectroscopy was performed for 50 different points.

In each of the obtained Raman spectra, a peak intensity (e.g., $I_D$) in a wavenumber region from 1335 cm$^{-1}$ to 1365 cm$^{-1}$ and a peak intensity in a wavenumber region from 1565 cm$^{-1}$ to 1620 cm$^{-1}$ (e.g., $I_G$) were measured. The measured peak intensities were applied to Equation 1 to obtain D/G peak intensity ratio values of Raman spectra for 50 different carbon-based particles.

Specific measurement conditions of the Raman spectroscopy are as follows.

i) Equipment: Renishaw in Via Raman spectroscopy
ii) Wavelength: 532 nm
iii) Grating: 1800 L/mm iv) Detector: CCD
v) Objective: ×20

The processing conditions of the data measured through the Raman spectroscopy are as follows.

i) Data processing software: Resolutions Pro.
ii) Baseline setting area for D/G peak intensity ratio measurement
a Si peak: 200/600 baseline
c Si peak: 200/600 baseline
D band peak: 1100/1800 baseline
G band peak: 1100/1800 baseline The standard deviation of the obtained D/G peak intensity ratio values was divided by an average value of the D/G peak intensity ratio values and then multiplied by 100 to calculate the relative standard deviation.

(2) Raman Spectroscopy Spectrum Analysis of Silicon

A Raman spectrum of silicon included in the silicon-containing coating was measured using a 532 nm laser Raman spectroscopy for each anode active material prepared according to the above-described Examples and Comparative Examples. In the obtained Raman spectrum, a silicon peak intensity in a region of 515 cm$^{-1}$ wavenumber and a silicon peak intensity in a region of 480 cm$^{-1}$ wavenumber were measured. The peak intensities were applied to Equation 3 to calculate the peak intensity ratio of the Raman spectrum of silicon.

(3) Measurement of Amorphous Property and Crystallite Size of Silicon

A crystallite size was calculated using an XRD analysis and Equation 2 as described above for each anode active material prepared according to the above-described Examples and Comparative Examples, When the silicon particle size was too small to be substantially measured through the XRD analysis, the anode active material was determined as being amorphous.

Specific XRD analysis equipment/conditions are shown in Table 1 below.

TABLE 1

| XRD(X-Ray Diffractometer) EMPYREAN | |
| --- | --- |
| Maker | PANalytical |
| Anode material | Cu |
| K-Alpha1 wavelength | 1.540598 Å |
| Generator voltage | 45 kV |
| Tube current | 40 mA |
| Scan Range | 10~120° |
| Scan Step Size | 0.0065° |
| Divergence slit | ¼° |
| Antiscatter slit | ½° |

(4) Evaluation on Life-Span Property (Capacity Retention)

Each lithium half-cell manufactured according to the above-described Examples and Comparative Examples was charged with a constant current at room temperature (25° C.) at a current of 0.1 C until a voltage reached 0.01V (vs. Li), charged with a constant voltage while maintaining 0.01V and cutting off at a current of 0.01 C, and discharged with a constant current of 0.1 C rate until the voltage reached 1.5V (vs. Li).

The charging and discharging were performed as one cycle, and charging and discharging of one cycle was further performed in the same manner. Thereafter, the applied current was changed to 0.5 C and 50 cycles were performed with a 10-minute interphase between the cycles.

The capacity retention was evaluated by calculating the discharge capacity after the 50 cycles as a percentage relative to the discharge capacity after the first cycle.

The evaluation results are shown in Tables 2 and 3 below.

TABLE 2

| No. | carbonization temperature (° C.) | | D/G peak intensity ratio of Raman spectrum of carbon-based particles | | | capacity retention |
| | first carbonization | second carbonization | average | standard deviation | relative standard deviation (%) | (%, 50 cycles) |
| --- | --- | --- | --- | --- | --- | --- |
| Example 1 | 600 | 900 | 1.01 | 0.017 | 1.68 | 92.5 |
| Example 2 | 500 | 900 | 0.98 | 0.025 | 2.55 | 92.5 |
| Example 3 | 400 | 900 | 1.07 | 0.042 | 3.93 | 91.0 |
| Example 4 | 350 | 900 | 1.01 | 0.081 | 8.02 | 85.7 |
| Example 5 | 650 | 900 | 1.06 | 0.105 | 9.91 | 83.8 |
| Example 6 | 600 | 700 | 1.35 | 0.101 | 7.48 | 88.4 |
| Example 7 | 600 | 800 | 1.22 | 0.032 | 2.62 | 90.6 |
| Example 8 | 600 | 1000 | 0.95 | 0.047 | 4.95 | 91.2 |
| Example 9 | 600 | 1200 | 0.90 | 0.075 | 8.33 | 90.8 |
| Example 10 | 600 | 1300 | 0.88 | 0.079 | 8.98 | 84.1 |
| Example 11 | 600 | 650 | 1.42 | 0.120 | 8.45 | 85.9 |
| Example 12 | 600 | 900 | 1.00 | 0.022 | 2.20 | 94.1 |
| Comparative Example 1 | — | 900 | 1.04 | 0.131 | 12.60 | 73.4 |
| Comparative Example 2 | 600 | — | 1.41 | 0.164 | 11.63 | 65.5 |
| Comparative Example 3 | 700 | 900 | 1.02 | 0.120 | 11.76 | 78.4 |
| Comparative Example 4 | 300 | 900 | 1.03 | 0.120 | 11.65 | 75.4 |
| Comparative Example 5 | 600 | 1400 | 0.87 | 0.20 | 22.99 | 70.2 |

TABLE 2

| No. | silicon-containing coating | | capacity retention |
| | crystallite size (nm) | peak intensity ratio (I(515)/I(480)) | (%, 50 cycles) |
| --- | --- | --- | --- |
| Example 1 | amorphous | 0.545 | 92.5 |
| Example 13 | 7.3 | 1.164 | 89.3 |
| Example 14 | 6.82 | 1.22 | 88.9 |

Referring to Tables 2 and 3, in Examples where the relative standard deviation of the D/G peak intensity ratio values of the Raman spectrum of the carbon-based particles was 10% or less, the capacity retentions were generally improved compared to those from Comparative Examples.

In Example 4, partial carbonization was not sufficiently performed as the first carbonization temperature was lower than 400° C., and the capacity retention was relatively lowered compared to those of other Examples.

In Example 5, the first carbonization temperature exceeded 600° C., and the crystallinity between the carbon-based particles was relatively non-uniform compared to those from other Examples, resulting in a reduction of the capacity retention.

In Example 10, the second carbonization temperature exceeded 1200° C., and the crystallization of the carbon-based particles was relatively further proceeded than those in other Examples, and the capacity retention relatively was lowered.

In Example 11, the average value of the D/G peak intensity ratio exceeded 1.4, resulting in a relatively low capacity retention compared to those from other Examples.

In Example 12, the carbon coating was formed on the silicon-containing coating to suppress a side reaction with water. Accordingly, the capacity retention rate was relatively improved compared to those from other Examples.

In Example 13, the crystallite size of silicon included in the silicon-containing coating exceeded 7 nm, resulting in a relatively low capacity retention compared to those from other Examples.

In Example 14, the peak intensity ratio (I(515)/I(480)) of the Raman spectrum of silicon included in the silicon-containing coating exceeded 1.2, resulting in a relatively low capacity retention compared to those from other Examples.

The present disclosures can be implemented in rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the present disclosures can be implemented in some embodiments to provide improved electrochemical devices such as a battery used in various power sources and power supplies, thereby mitigating climate changes in connection with uses of power sources and power supplies. Lithium secondary batteries based on the present disclosures can be used to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only specific examples of implementations of certain embodiments of the present disclosures are described in this patent document. Variations, improvements and enhancements of the disclosed embodiments and other embodiments may be made based on the disclosure of this patent document

What is claimed is:

1. An anode active material for a lithium secondary battery, comprising:

a plurality of carbon-based particles containing one or more pores; and a silicon-containing coating formed inside the one or more pores, or on a surface of each of the carbon-based particles, or both inside the one or more pores and on the surface of each of the carbon-based particles, wherein a relative standard deviation of D/G peak intensity ratios of a Raman spectrum as defined in Equation 1 measured for 50 different carbon-based particles among the plurality of carbon-based particles is 10% or less:

$$D/G \text{ peak intensity ratio of Raman spectrum} = I_D/I_G \qquad \text{[Equation 1]}$$

wherein, $I_D$ is a peak intensity of each carbon-based particle in a wavenumber range from 1335 cm$^{-1}$ to 1365 cm$^{-1}$ of the Raman spectrum, and $I_G$ is a peak intensity of each carbon-based particle in a wavenumber range from 1565 cm$^{-1}$ to 1620 cm$^{-1}$ of the Raman spectrum.

2. The anode active material of claim 1, wherein the relative standard deviation is determined by: obtaining a value by dividing a standard deviation of the D/G peak intensity ratios of the Raman spectrum by an average value of the D/G peak intensity ratios of the Raman spectrum; and multiplying the value by 100.

3. The anode active material of claim 1, wherein the D/G peak intensity ratios of the Raman spectrum are in a range from 0.8 to 1.4.

4. The anode active material of claim 1, wherein each of the plurality of carbon-based particles includes at least one selected from the group consisting of activated carbon, carbon nanotube, carbon nanowire, graphene, carbon fiber, carbon black, graphite, pyrolyzed cryogel, pyrolyzed xerogel and pyrolyzed aerogel.

5. The anode active material of claim 1, wherein each of the plurality of carbon-based particles has an amorphous structure.

6. The anode active material of claim 1, wherein silicon included in the silicon-containing coating has an amorphous structure or a crystalline structure with a crystallite size of 7 nm or less as measured by an X-ray diffraction (XRD) analysis.

7. The anode active material of claim 6, wherein the crystallite size of silicon included in the silicon-containing coating is measured by Equation 2:

$$L = \frac{0.9\lambda}{\beta\cos\theta}, \qquad \text{[Equation 2]}$$

wherein, L represents the crystallite size in nanometer, $\lambda$ represents an X-ray wavelength in nanometer, $\beta$ represents a full width at half maximum of a peak corresponding to a (111) plane of silicon contained in the silicon-containing coating in radian, and $\theta$ represents a diffraction angle in radian.

8. The anode active material of claim 1, wherein the silicon included in the silicon-containing coating has a peak intensity ratio of 1.2 or less in a Raman spectrum defined by Equation 3:

$$\text{Peak intensity ratio of Raman spectrum} = I(515)/I(480) \qquad \text{[Equation 3]}$$

wherein, I(515) is a peak intensity of silicon included in the silicon-containing coating in a wavenumber region of 515 cm$^{-1}$ in the Raman spectrum, and I(480) is a peak intensity of silicon included in the silicon-containing coating in a wavenumber region of 480 cm$^{-1}$ in the Raman spectrum.

9. The anode active material of claim 1, further comprising a carbon coating formed on the silicon-containing coating.

10. The anode active material of claim 9, wherein the carbon coating includes carbon or a conductive polymer.

11. The anode active material of claim 9, wherein the carbon coating is also formed inside the pores and on a surface of the carbon-based particles where the silicon-containing coating is not formed.

12. A lithium secondary battery, comprising:

an anode comprising an anode active material layer that comprises the anode active material for a lithium secondary battery of claim 1; and a cathode facing the anode.

13. A method of preparing an anode active material for a lithium secondary battery, comprising:

performing a first carbonization on a plurality of preliminary carbon-based particles at a first temperature;

performing a second carbonization on the plurality of preliminary carbon-based particles after the first carbonization at a second temperature greater than the first temperature to form a plurality of carbon-based particles each including one or more pores; and performing a heat treatment on the plurality of carbon-based particles together with a silicon source to form a silicon-containing coating inside the pores, or on a surface of each of the carbon-based particles, or both inside the one or more pores and on the surface of each of the carbon-based particles, wherein a relative standard deviation of D/G peak intensity ratios of a Raman spectrum as defined in Equation 1 measured for 50 different carbon-based particles among the plurality of carbon-based particles is 10% or less:

$$D/G \text{ peak intensity ratio of Raman spectrum} = I_D/I_G \qquad \text{[Equation 1]}$$

wherein, $I_D$ is a peak intensity of each carbon-based particle in a wavenumber range from 1335 cm$^{-1}$ to 1365 cm$^{-1}$ of the Raman spectrum, and $I_G$ is a peak intensity of each carbon-based particle in a wavenumber range from 1565 cm$^{-1}$ to 1620 cm$^{-1}$ of the Raman spectrum.

14. The method of claim 13, wherein the first temperature ranges from 400° C. to 600° C., and second temperature ranges from 700° C. to 1200° C.

15. The method of claim 13, wherein the preliminary carbon-based particles are formed by adding a curing agent to a resol oligomer to cure the resol oligomer, and classifying and washing the cured resol oligomer.

* * * * *